United States Patent [19]

Ljung

[11] 4,019,391
[45] Apr. 26, 1977

[54] VIBRATORY GYROSCOPE

[75] Inventor: Bo Hans Gunnar Ljung, Wayne, N.J.

[73] Assignee: The Singer Company, Little Falls, N.J.

[22] Filed: July 25, 1975

[21] Appl. No.: 599,126

[52] U.S. Cl. .............................................. 73/505
[51] Int. Cl.² ...................................... G01C 19/56
[58] Field of Search ....................... 73/505; 310/25

[56] References Cited

UNITED STATES PATENTS

| | | | |
|---|---|---|---|
| 2,514,250 | 7/1950 | Meredith | 73/505 X |
| 2,627,400 | 2/1953 | Lyman et al. | 73/505 |
| 3,201,998 | 8/1965 | Horn | 73/505 |
| 3,913,405 | 10/1975 | Ljung et al. | 73/505 |

Primary Examiner—James J. Gill
Attorney, Agent, or Firm—Thomas W. Kennedy

[57] ABSTRACT

A vibratory gyroscope including a cylindrical casing with a vibrating assembly attached inside, the vibrating assembly consisting of two tubes each fitted with two concentric cylindrical weights with each tube connected to the casing using a gimbal system fitted longitudinally between weights with means, preferably an elastic rod, connecting the two tubes to form the vibrating inertial assembly.

36 Claims, 9 Drawing Figures

VIBRATORY GYROSCOPE

BACKGROUND OF THE INVENTION

This invention relates to gyroscopes in general and more particularly to an improved vibratory gyroscope.

Vibratory gyroscopes may be rate integrating vibratory single axis gyroscopes used to facilitate navigation tasks specifically in regard to strap down inertial navigation of vehicles, such as airplanes. Vibratory gyroscopes may also be employed as rate gyroscopes used primarily as sensors for stabilization purposes. In the past, it has been customary, however, to use rotary gyroscopes to obtain inertial rotation reference to one or more axis in a moving vehicle. The main problem with such gyroscopes is that they employ bearings that have limited life. The life expectancy is typically only five thousand hours. To overcome this problem hydrodynamic bearings have been developed. Their main drawbacks are excessively small bearing gaps, high running power and limited capability to be stopped and started due to wear, and extremely high cost.

In search for better gyroscopes, the development of linear vibrating angular direction sensors has taken place. One such sensor is disclosed in U.S. application Ser. No. 498,035 filed Aug. 16, 1974 and assigned to the same assignee as the present invention. As fully disclosed therein the vibrating gyroscope utilizes conservation of linear momentum to sense angular rotation about its input axis. Although the previously disclosed sensor offers many advantages is does have a number of drawbacks. The previously disclosed vibrating gyroscope utilizes two necked down shafts to suspend the vibrating elements from the casing. The flexures must be made relatively weak in bending compared with the rod joining the two vibrating inertial assemblies in order to insure a high Q value for the sensor and consequently a low drift. The rod is preferably made of a material with a high Q value as ceramic. The flexures must be made of a tough, high-strength material such as a titanium alloy Ti-6% Aluminum-4% Vanadium. This is necessary so that the instrument can withstand rough handling and a severe vibrational environment such as that found in an aircraft where such sensors may be used in a strapped down mode. However, materials of this strength and toughness also exhibit low Q values. That is to say they have high internal energy losses. Fortunately, in the previously disclosed instrument the requirement for high Q value on one hand and a reasonable shock susceptibility on the other hand can be compromised. However, in reaching this compromise a third important characteristic is impaired: the suspension is weak in the radial and torsional directions. As a result, a relatively low resonant frequency exists in the radial direction. In the prior art instrument this frequency is approximately 400 Hz. As a result, this frequency is within the pass band specified in MIL-E-5400 which may be used in evaluating instruments of this nature. Furthermore, the low frequency results in an increased coupling between the instrument and the environment resulting in a larger drift due to unbalances than is desired. Thus, an increase of the resonant frequency by approximately four times to a frequency of 1600 Hz in the radial direction would be desirable. This would make the resonant frequency higher than the test pass band of MIL-E-5400. The coupling between the vibrating parts in the instrument and the environment would also be considerably reduced. This will result in a large reduction of the drift due to the unbalances in the instrument. However, to modify the prior art instrument to obtain the four-fold increase in resonant frequency the stiffness of the flexures would have to be increased by a factor $4^2$. Unfortunately, to do so would seriously impair the design tradeoff mentioned above. That is to say the flexures would then, instead of sharing two percent of the total potential energy with th flexible rod, assume 32 percent. It would then become impossible to achieve the high Q value needed for low drift operation.

An even more cumbersome problem in the prior art instrument is the fact that the resonant frequency of the vibrating elements in torsion is quite low being in order of 30 Hz. It would be desirable to raise this frequency to above 1000 Hz. Obviously, it would be impossible to scale the dimensions of the prior art instrument to achieve such a result.

In view of this, the need for an improved instrument of this nature which does not suffer from these deficiencies and is of a simple construction becomes evident.

SUMMARY OF THE INVENTION

The present invention provides such a vibrating gyroscope. Like the prior art device it also utilizes the conservation of linear momentum to sense angular rotation about its input axis. A number of embodiments of a single axis, vibrating gyroscope are disclosed for use both as rate integrating and rate gyroscopes. In general terms, the instrument is comprised of a cylindrical casing with a vibrating assembly attached inside. The vibrating assembly consists of two tubes, each fitted with two concentric cylindrical weights. Each tube is connected to the casing by means of a gimbal system fitted longitudinally between the weights. In the preferred embodiment, an elastic rod connects the two tubes to form a vibrating inertial assembly. The longitudinal center point of the rod may also be connected to the case in the preferred embodiment. Various modifications are disclosed including an arrangement in which two rods are used in place of one. Also described in an adaptation of the assembly as a rate sensing gyroscope and a novel electrical system for such a rate gyroscope.

Because, in the preferred embodiment, the vibrating elements are supported in the axial direction by an elastic rod that is attached rigidly to the casing and flexures support the vibrating element in radial and torsional directions, high resonant frequencies, in axial, radial and torsional modes result. In turn this provides an instrument having greatly improved drift characteristics when used in an aircraft environment and in addition provides an instrument with an improved shock tolerance.

The instrument of the present invention is also insensitive to differential expansion. In the prior art device differential expansion of inside parts and the outside casing caused unwanted axial stresses which showed up as a second order phenomena and caused angular drift. Because of this, the prior art device was designed with a flexible support between the vibrating element and casing. Such a design unfortunately lowers the axial resonant frequency considerably. In contrast thereto these problems are avoided in the instrument of the present invention. The center support of the flexible rod supports the vibrating assembly in the axial direction. The flexure supports, thus, can be weak in the axial direction. As a result axial differential expansion does not cause any axial forces to develop. Furthermore, these advantages are obtained without imparing other characteristics.

The simple construction of the instrument of the present invention permits it to be easily balanced in a test fixture prior to final assembly. That is to say the outside mounted flexures may be used, in a simple manner, to support the instrument in a test fixture making it possible and practical to balance the instrument rapidly using a laser to trim the masses, for example. Because of the ability to balance the instrument automatically and rapidly using such a device, balancing costs are greatly reduced. Furthermore, the overall cost of the instrument is much lower than that of the prior art device because of a reduced parts cost. Approximately 36 weights and holders present in the prior device are eliminated in the instrument of the present invention.

In addition, the present instrument has automatic gap setting. In the prior art vibrating gyroscope described above, 20 parts, including 16 screws, are used to support the vibrating elements. In contrast the instrument of the present invention requires no additional parts to accomplish this support. As will be described in detail the flexure support is fabricated such that the gap between the vibrating part and the inner diameter of the casing is self-adjusting. The cylindrical gap between the inner diameter of the casing and the outer diameter of the four vibrating weights is utilized for several purposes. The inner diameter of the casing is metallized with for instance platinum or gold. The casing itself may be manufactured of dense aluminum oxide. The metallization on the inner diameter of the casing may be divided in segments to provide capacitors. The capacitance between these segments and the vibrating weights varies with the motion of the weights. This fact may be utilized to sense the vibrations by means of a charge amplifier. The design of such charge amplifiers is well known for those skilled in the art. The capacitors may also be used as forcers to provide means to maintain a constant vibrating amplitude. Further, eight evenly distributed segmented electrodes may be provided to facilitate control of the vibrating assembly's orbit. It is desirable to maintain a straight line orbit in order to achieve low angular drift. Such drift occurs if the orbit is allowed to become elliptical. It is, however, possible to vary the electrical field in the beforementioned eight capacitors to modify the vibrating assembly's spring constant in such a manner as to maintain a straight orbit. A scheme to implement the aforementioned orbit control is described in application Ser. No. 534,615 filed Dec. 20, 1974 and assigned to the same assignee as the present invention. It is quite important in the beforementioned applications to achieve and maintain a concentric gap between casing and weights in order to obtain good performance. The gap is automatically set by design: The flexure suspension, that connects the vibrating assembly to the inner diameter of the casing is fabricated such as to provide a concentric gap.

In addition, as compared to the prior art device, stresses in the elastic rod are reduced by 60% and the elastic rod has a diameter 20% larger making fabrication and handling easier and lowering costs. This results at least partially from having the flexible rod extending over almost the entire length of the instrument to maximize energy storage volume along with reducing stress.

The flexible rod will preferably be fabricated from a single crystal sapphire. Suitably processed such a rod exhibits very low mechanical losses, $1/Q = 4.10^{-6}$, which property is quite important in this application.

Other disclosed features include a vacuum-tight outer casing with electric feed-throughs which eliminates the need for an additional vacuum-tight container having feed-through connectors.

When used as a rate gyroscope the above noted advantages come into play. In addition, the rate gyro includes a magnetic pickup and magnetic forcer of mutually identical design which permit keeping the overall cost low. Also disclosed in an electronic system for operating in the rate gyro mode which provides for different gains and time constants. Typically such adjustment requires design changes in conventional gyroscopes requiring the production of many different rate gyros. With the arrangement of the present invention this can be accomplished in a single model by simply varying the gain, for example, by changing a program resistor permitting time constant and gain to be changed to accomodate the requirement of the specific application.

DETAILED DESCRIPTION OF THE PREFERRED EMBODIMENT

Figure 1:
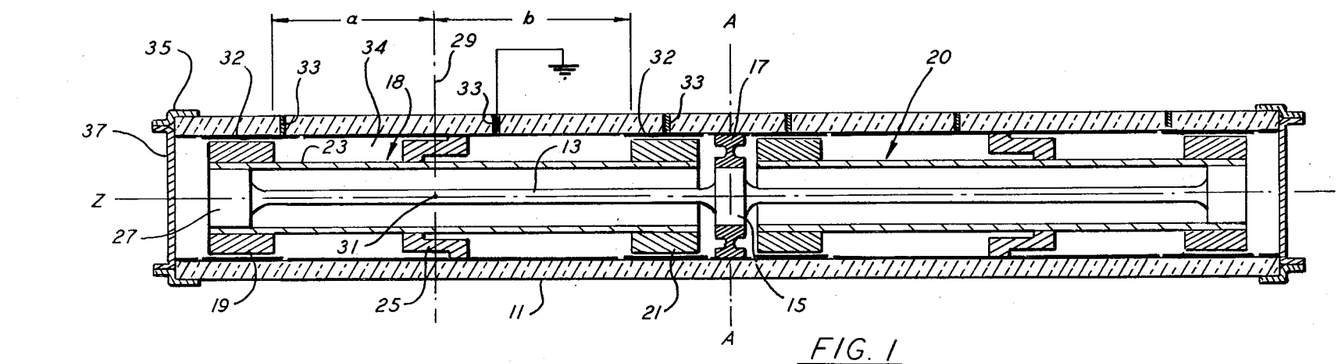
FIG. 1 is a cross-sectional view through one embodiment of a vibrating gyroscope according to the present invention.

FIG. 1 shows a cross-sectional view of the gyroscope instrument of the present invention. The instrument has rotational symmetry about an axis Z—Z. In addition the instrument has a longitudinal symmetry about plane A—A, the instrument being identical on both sides thereof. The instrument includes a casing 11 inside of which are disposed the vibrating elements. Extending essentially throughout the full length of the instrument is a flexible rod 13. In the embodiment of FIG. 1 rod 13 has an enlarged termination portion 15 which is attached by means of a ring 17 to the casing 11. The rod will preferably be made of single crystal sapphire or a cemented titanium carbide. The left inertial assembly 18 comprises inertial weights 19 and 21 rigidly attached to opposite ends of a tube 23. The right inertial assembly 20 is of identical design. The tubes 23 may be made of columbium or a columbium-hafnium alloy. Each inertial assembly is supported by an external flexure 25 to be described in more detail in connection with FIG. 2. The rod 13 is rigidly attached to the inertial assembly by means of attachment to the tube 23 at the termination 27. Preferably this attachment should be accomplished such as to eliminate energy losses. A preferred method of attachment is by vacuum brazing the parts together at 1135° C with a low damping alloy such as 70% titanium, 30% nickel. The potential energy of the instrument is stored in the flexible rod 13. Energy is coupled from one inertial assembly to the other, i.e. from left hand inertial assembly 18 to right hand inertial assembly 20, because of the fact that the rod termination 15 combined with the ring 17 has less than infinite stiffness.

In order to achieve dynamic balance the flexure 25 is located with its center lying in plane 29 which is located at distance a away from the inertial weight 19 which is less than the distance b from the inertial weight 21. The ratio of $a$ to $b$ is selected to place the nodal point 31 of the inertial assembly coincident with the center plane of the flexure support. With this positioning of the flexure the center of mass is stationary when the inertial assembly and rod vibrate around the nodal point 31. As a result the instrument can be made totally and completely balance statically as well as dynamically. Implicit in such balancing is the fact that energy transfer from the instrument to the environment and vice-versa is nonexistent.

The instrument can be electrically sensed and driven in the same manner as the vibrating instrument disclosed in the aforementioned application Ser. No. 534,615. Preferably, the casing 11 is made of glass or an insulating ceramic, such as dense aluminum oxide, having the same temperature expansion coefficient as the flexible rod 13. Electrodes 32 made, for instance, of platinum or gold can be plated on the inside of the casing. To establish contact with these electrodes, holes can be formed in the casing and contain in there short metal rods 33 which have been vacuum brazed in place. Preferably the whole inside of casing 11 will be plated and the electrodes 32 formed by forming gaps in the plating. The remainder 34 of the plating will then be ground as illustrated. Preferably the casing will have flanges 35 attached by vacuum brazing with end caps 37 electron beam welded to the flanges 35. Preferably such will be done in a vacuum to provide an instrument which is vacuum tight and evacuated. Alternatively, end caps 37 can be provided with a pinch-off tube for use in evacuation. When operating the instrument in a free, or rate integrating mode, it is desirble that operation take place in vacuum to eliminate gas damping.

Figure 1A:
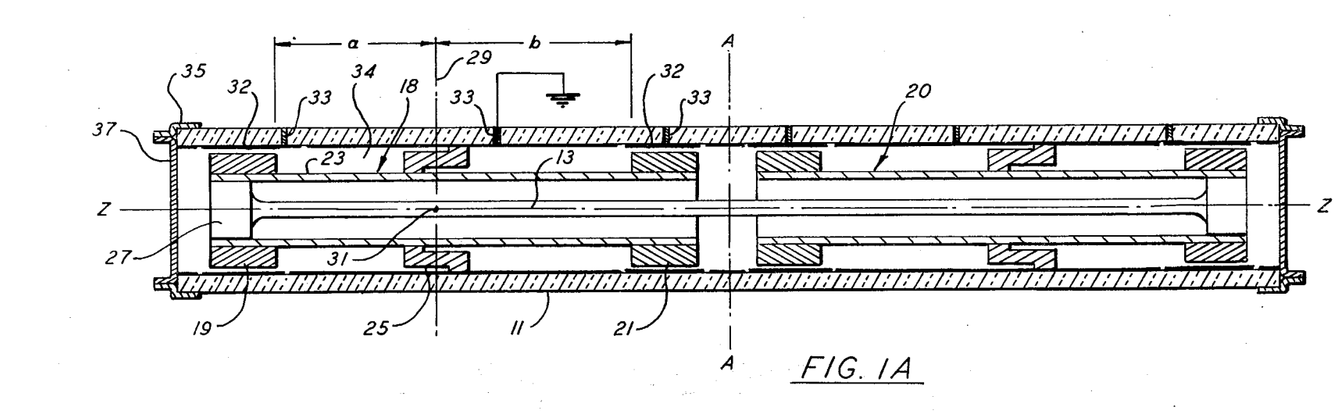
FIG. 1A is a partial cross-sectional view illustrating an alternate embodiment of the gyroscope of FIG. 1.

The center support comprising terminator 15 and ring 17 may be eliminated if the flexures 25 are made axially stiff. In such a design, as illustrated by FIG. 1A, the flexure supports 25 may be mounted in an anti-symmetric fashion, e.g. they may be mounted such that they are turned the same way. It is possible to gain an advantage by such a mounting in that expansion mismatch between the flexure material and other parts have less of an impact by reducing longitudinal offsets. As will be explained below these flexures are obtained through the use of holes forming hinges. The required stiffness can be accomplished by reducing the hole diameters forming these hinges. The elimination of the portions 15 and 17 will result in a somewhat simpler instrument. The remainder of FIG. 1A is identical to FIG. 1 and will not be explained in further detail.

Furthermore in certain less demanding applications, a single ended, unbalanced version of the arrangement of FIG. 1 may be used. This will simply comprise an instrument that is cut off at the plane AA of FIG. 1. Such a modification is much more practical however in the rate gyro to be described below.

Figures 2, 3A:
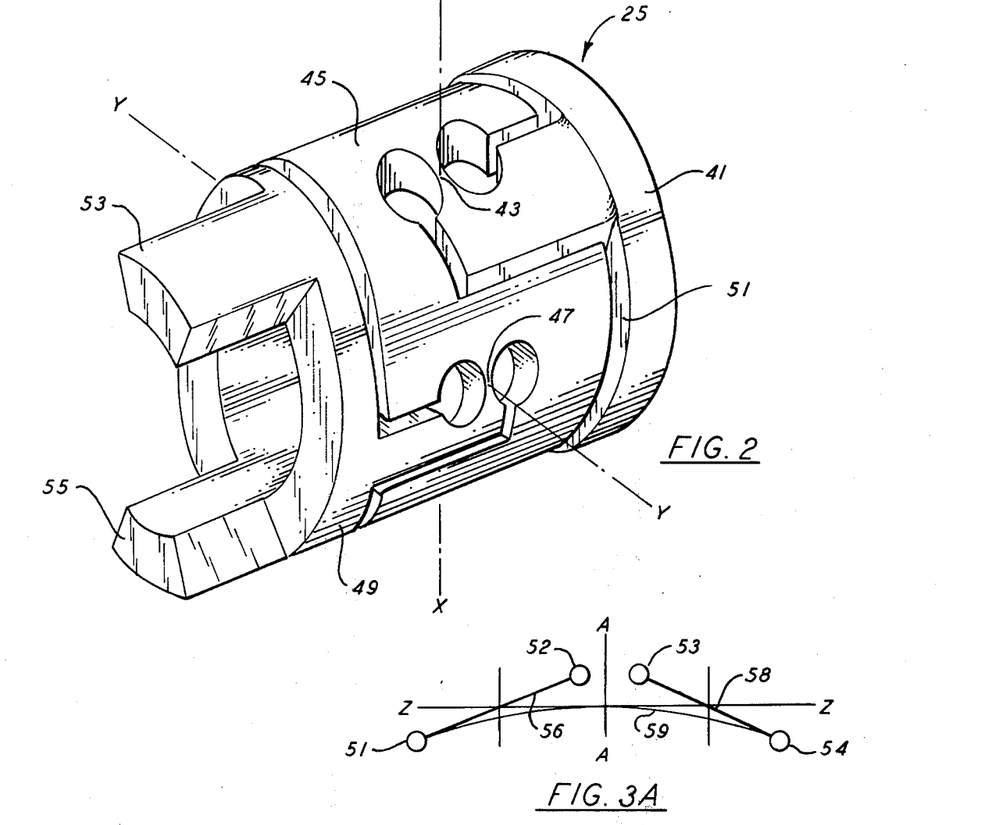
FIG. 2 is a perspective view of the flexure used in the gyroscope of FIG. 1
FIGS. 3A and 3B are a schematic diagrams helpful in understanding operation of gyroscope of FIG. 1.

The flexure 25 of FIG. 1 is shown in more detail in a perspective view of FIG. 2. The flexure 25 comprises a two axis gimbal system. It includes a gimbal portion 41, shown to the right, having an enlarged outside diameter which is attached for example by bonding with an adhesive to casing 11 of FIG. 1. The gimbal portion 49, shown to the left, is coupled through two flexure hinges 43, one of which is visible on drawing and the other of which is displaced 180° therefrom to a middle gimbal section 45. The middle gimbal section 45 is coupled by means of two additional hinges 47 to an upper gimbal portion 49. The hinges 47 are displaced 180° from each other and are orthogonal to the hinges 43. Thus, as illustrated the hinges 43 lie on the X axis and the hinges 47 on the Y axis. Hinges 43 permit rotation abut the X axis and hinges 47 about the Y axis. The gimbal portion 49 shown at the left has an inside diameter which is slightly smaller than the inside diameter of the middle portion 45 and right hand portion 41. This permits it to be rigidly connected to the tube 23 of the vibrating assembly shown on FIG. 1. Such connection may be made by means of adhesive bonding. The flexure hinges 43 and 47 are formed by means of holes drilled the desired distance apart to leave a remaining section of the desired cross-section to obtain the necessary hinge. Separation of the three portions of the flexure is accomplished through the use of slots such as the slots 51 extending from the holes in the necessary directions to separate the three portions 41, 45 and 49. In order to achieve low drift of the instrument equal inertia is desirable. For this reason, the projections 53 and 55 on the portion 49 are provided.

Preferably the entire flexure will be manufactured of a single piece of tough high strength material such as a titanium alloy, e.g. Ti-6% Aluminum - 4% Vanadium or a cemented titanium carbide. The forming of the necessary shape, for example, the slots 51 can be accomplished by electric discharge machining. Furthermore, the flexure should have indentical inertia in all mutually perpendicular directions.

Figures 3B, 6:
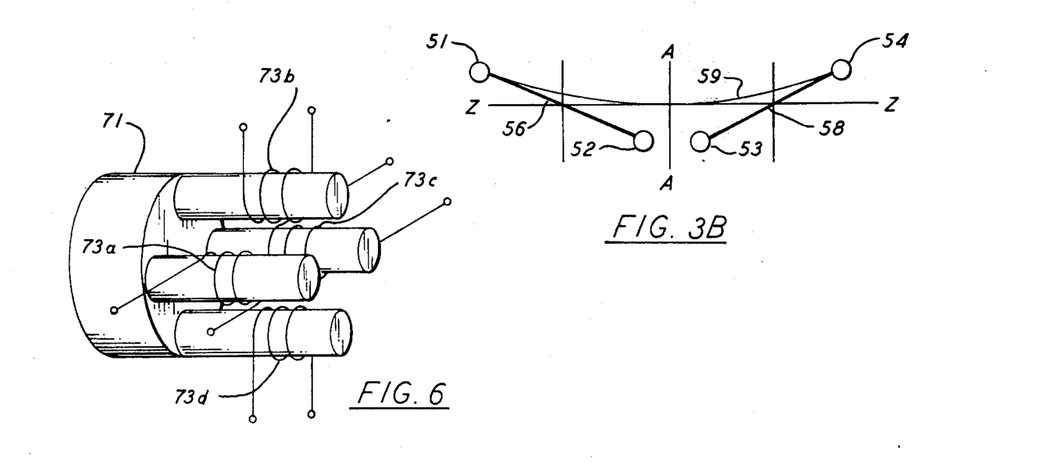
FIG. 6 is a perspective view of the magnetic forcer and/or pickup unit used in the embodiment of FIG. 5.

FIGS. 3A and B are schematic illustrations helpful in understanding the operation of vibratory gyroscope of FIG. 1. On these figures, mass points 51, 52, 53 and 54 corresponding to the weights or masses 19 and 21 of FIG. 1 are illustrated. The mass points 51 and 52 are connected rigidly with a massless member 56 and masses 53 and 54 with a massless member 58. The mass systems are connected to each other by an elastic rod 59. In the illustrations of FIG. 3A and 3B the gyroscope is shown in greatly exaggerated deflected positions. In actual operation deflection is in the order of 0.002 radians. In the position shown on FIG. 3A all energy is stored in the elastic rod 59. When released, the rod will gradually assume a straight shape. When that occurs the energy is stored in the inertial assemblies as kinetic energy. At the other extreme the vibrating points will assume the position shown in FIG. 3B. The energy will again be stored as potential energy in the rod. When balanced to achieve the same oscillating frequency in all planes, the plane of vibration illustrated by FIG. 3A and B will be, in a pracitcal sense stationary in space even if the casing and the parts contained therein was to be rotated around the input axis Z—Z. The plane being referred to is the plane which contains all the mass points 51, 52, 53 and 54 in both extreme positions and positions in between. That is it will be a plane passing through the Z axis and the extreme positions shown. Because the plane of vibration is essentially fixed in space it is possible to sense, using electrodes fixed to the casing, rotation about the input axis Z-Z.

The system may be driven by using a feed back system similar to that devised for the aforementioned system disclosed in application Ser. No. 534,615. To accomplish a straight vibration plane, fine balancing is required by means of electrostatic field. The ellipticity in the vibration of the instrument is detected and the spring rate electrostatically modified to eliminate this ellipticity and thereby balance the instrument in a dynamic fashion and thus greatly reduce drift-rate. A feed back balance system of this nature facilitates the use of outside flexures supports that may have larger differential spring constants than the suspension by necked down supports disclosed in connection with application Ser. No. 534,615.

Initial balancing of the instrument can be carried out prior to final assembly. The outside mounted flexures 25, see FIG. 1, provide an easily used support of the instrument in a vibration test fixture. The dynamic unbalances can be detected and corrected through appropriate drilling with a laser, for example. This permits greatly reducing cost of balancing because it can be carried out automatically and rapidly.

Figure 4:
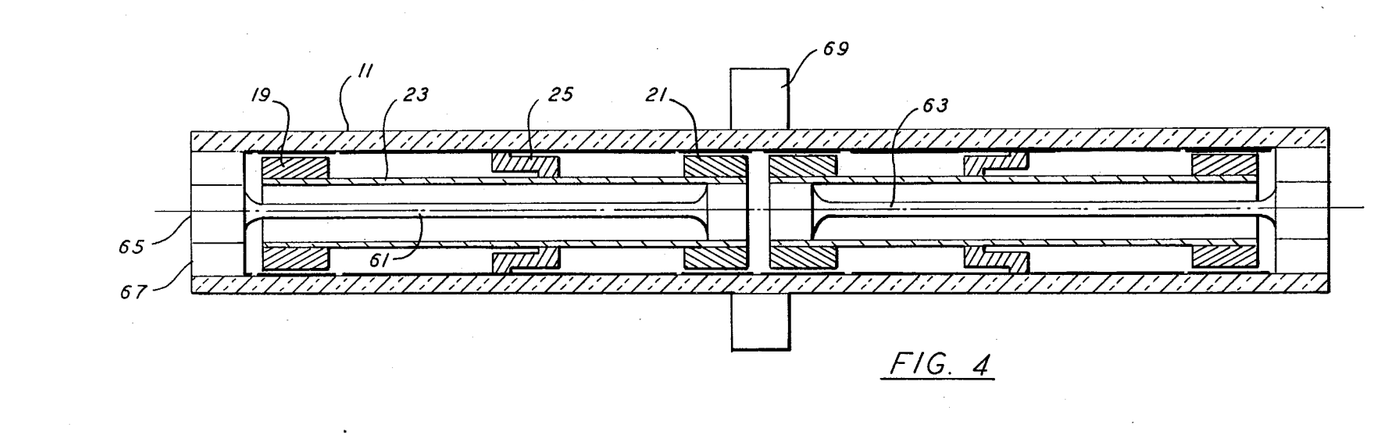
FIG. 4 is a partial cross-sectional view illustrating another alternate embodiment of the gyroscope.

FIG. 4 illustrates an alternate form of construction of the present invention. In this Figure, identical parts are given identical references and will not be reexplained. First, as illustrated, the vibrating assembly is the same as in FIG. 1 and is again supported by the flexure 25. The primary difference in this embodiment is that rather than using a single flexible rod 31 as in FIG. 1, separate flexible rods 61 and 63 are provided with the rod secured to the casing 11 at each end by means of a termination 65 and ring 67. In this embodiment the connection between the two vibrating assemblies is through the casing 11. This embodiment has the advantage that the vibration assemblies can be separately balanced and tested thus simplifying that process. The mutual coupling between the two portions of the instrument is primarily influenced by the mechanical impedance of the outside mount 69 attached to the casing 11. Coupling will increase as the mechanical impedance of the mount 69 is lowered. Aside from these differences the function and performance of this embodiment are as disclosed in connection with the embodiment of FIG. 1. Ring 67 and termination 65 may be at the center rather than the end.

Figure 5:
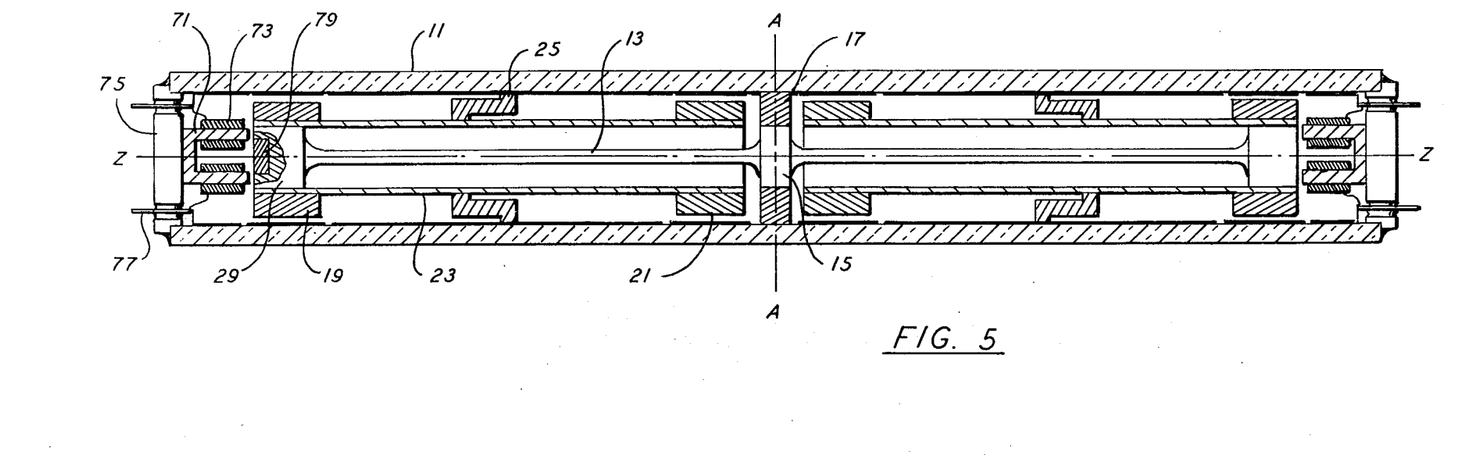
FIG. 5 is a view similar to FIG. 1 illustrating the gyroscope configured as a rate sensing gyroscope.

FIG. 5 illustrates the vibratory gyroscope of FIG. 1 configured as a rate gyroscope. Once again identical parts to FIG. 1 are given identical reference numerals and will not be further explained. The illustrated gyroscope of FIG. 5 is used for sensing angular rates about the input axis Z—Z. In this embodiment it is preferred that all vibrating parts be made of high strength metal such as a titanium alloy (titanium - 6% Aluminum - 4% Vanadium or a cemented titanium carbide) to further enhance rough handling capabilities and to decrease cost. In this embodiment large gaps between the casing and inertial elements 19 and 21 are employed to further lower costs. This embodiment utilizes a magnetic forcer and magnetic pickup. A forcer is installed at one end of the instrument and a pickup at the other. The design and construction of the forcer and pickup are identical thereby simplifying the instrument. Illustrated on FIG. 5 is one of these units, a pickup for example. It comprises an iron core 71 having four coils 73 wound around legs as will be more clearly evident from FIGS. 6 and 7. The unit is supported in an end piece 75 which is attached to the casing 11 in the manner described above in connection with FIG. 1. The end piece 75 is provided with appropriate feed-through connections 77 to permit electrical connection between outside of the instrument and the coils 73 inside. To provide the necessary magnetic coupling between the forcer or pickup and vibrating assembly, a magnetically soft button 79 is installed in the termination 29 at each end of the flexible rod 13.

FIG. 6 illustrates in perspective schematic form a magnetic or pickup utilized in the arrangement of FIG. 5. Illustrated is the core of armature 71 which will be a soft magnetic armature and, shown schematically, the coils 73a, 73b, 73c and 73d.

Figure 7:
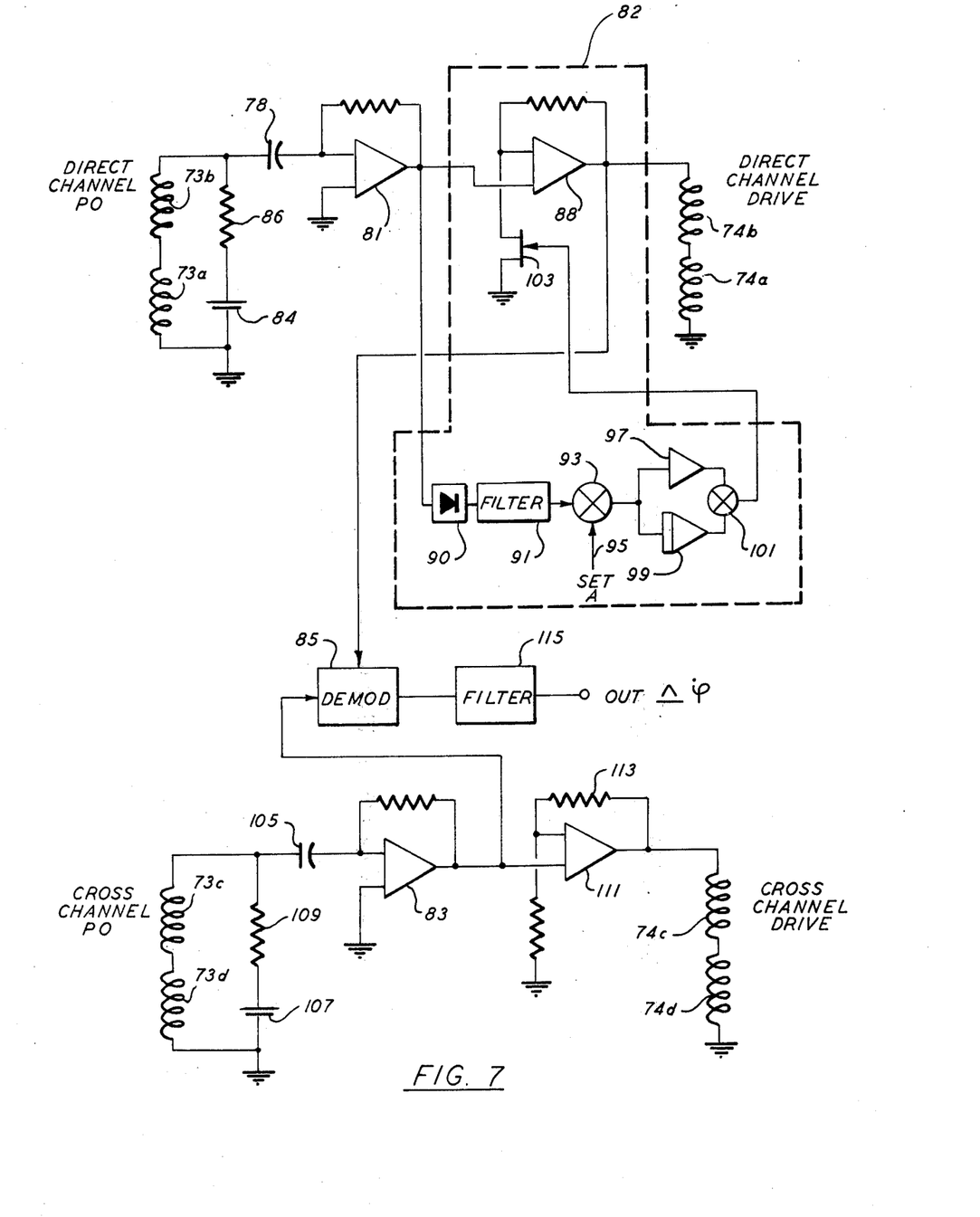
FIG. 7 is an electrical schematic of the electrical system used in conjunction with the rate sensing gyroscope of FIG. 5.

FIG. 7 is an electrical schematic of the circuits used in conjunction with the gyro of FIG. 5. As illustrated the coils 73a and 73b, in series, which are direct channel pickup coils, are coupled through a capacitor 78a an input to an amplifier 81. The output of amplifier 81 is fed to an automatic gain control circuit 82. A battery 84 and resistor 86 provides for the bias of the coils.

Included in automatic gain control circuit 82 is an operational amplifier 88 with it non-inverting input coupled to the output of amplifier 81. This output is also rectified by a rectifier 90 and filtered by a low pass filter 91 from which it is fed to a summing junction 93. Here it is differenced with a preset value on line 95 to develop an error signal which is fed through an amplifier 97 and integrator 99 to a summing junction 101. Summing junction 101 is coupled as the control input to the gate of a junction FET 103 coupling the inverting input of amplifier 88 to ground. A feedback resistor couples the output of amplifier 88 to its input. The signal from coils 73a and 73b is amplified and fed from amplifier 88 to corresponding forcer coils 74a and 74b in series. The feedback herein is of a positive nature and causes the vibrating elements to vibrate at a constant amplitude because of the automatic gain control operation. Vibration will be only in the plane of the coils 73a and 73b. If the instrument is rotated with an input rate about the input axis Z—Z, the axis of vibration will, due to the conservation of linear momentum, rotate with respect to the case and the case-fixed coils. This will result in an output from the pickup 73c and 73d. This output is coupled through a capacitor 105 into an amplifier 83. Coil bias is provided by battery 107 and resistor 109. The output of amplifier 83 is fed to an amplifier 111 without automatic gain control. In addition, this amplifier will be one having adjustable gain obtained by means of a single program resistor 113 or the like. The output of amplifier 111 is provided to the forcer coils 74c and 74d. The phasing of these forcer coils is chosen such as to provide a negative feedback that will tend to damp out the oscillation in the plane passing through the coil 73c and 73d. The output of the amplifier 88 is also provided to an input to a phase sensitive demodulator 85 obtaining a reference from the AGC amplifier 88. The output of the demodulator, after proper filtering in filter 115, is a quantity proportional to and an accurate representation of the rate input to the sensor. The amount of time required for the oscillations in the plane containing the coils 73c and 73d to die out will depend only on the gain set into amplifier 111, by resistor 113, which is feeding back to the coil 74c and 74d. As a result, by proper selection of the gain, the time constant can be changed electrically to suit particular needs. This is in contrast with conventional rate gyroscopes where design changes are required to accomplish the same i.e. both the restoring springs and dampers must be changed. It should also be noted that this electrical damping is not affected by pressures and temperature changes, as is usually the case where hydrodynamic damping is used. It should be noted that the alternate arrangement of FIG. 4 can also be utilized as a rate gyro.

Thus, an improved vibratory gyroscope having significant advantages both in operational characteristics and in simplicity and reduced cost over those known in the prior art has been disclosed. Although specific embodiments have been illustrated and described, it will be obvious to those skilled in the art that various modifications may be made without departing from the spirit of the invention which is intended to be limited solely by the appended claims.

What is claimed is:
1. A vibrating gyroscope comprising:
   a. an elogated hollow casing having a longitudinal axis, said casing having an inside perimeter;
   b. first and second vibrating assemblies each comprising:
      1. a support tube having an outside perimeter less than the inside perimeter of said casing;
      2. a first inertial weight on one end of said tube; and
      3. a second inertial weight on the other end of said tube;
   c. first and second flexures disposed between the outside perimeter of the support tubes of said first and second vibrating assemblies respectively and the inside perimeter of said casing supporting said first and second vibrating assemblies symmetrically along said longitudinal axis within said casing such that said one end of said first assembly lies next to said one end of said second assembly; and
   d. an elongated flexible rod lying on said longitudinal axis coupling said first and second vibrating assemblies to each other.

2. Apparatus according to claim 1 wherein said flexible rod is also coupled to said casing at the plane of symmetry between said two vibrating assemblies.

3. Apparatus as in claim 2 wherein said rod contains a terminating portion of enlarged cross section and is coupled to said tube through a connecting ring between said terminating portion and said casing.

4. Apparatus as in claim 1 wherein said flexible rod contains end terminating portions which are ridgidly connected to the tubes of said first and second inertial assemblies.

5. Apparatus as in claim 4 wherein the connection between said tubes and said end terminating portions is by vacuum brazing.

6. Apparatus according to claim 1 and further including means closing off the ends of said casing.

7. The apparatus according to claim 1 wherein a plane passing through the center of the flexure, coupling said vibrating assemblies and said case, is located closer to the mass on the other end than to the mass located on said one end.

8. The apparatus according to claim 1 wherein the weight on said other end is made having a smaller mass than the weight on said one end and with the flexure support mounted equidistant therebetween to achieve balance.

9. Apparatus as in claim 6 wherein the inside of said casing is evacuated and sealed by said means on the end of said casing.

10. Apparatus according to claim 9 wherein said means on the end of said casing comprise a flange vacuum brazed to said casing and an end cap electron beam welded to said flange.

11. Apparatus as in claim 9 wherein evacuation and sealing is accomplished by a pinch-off tube welded to said cap.

12. Apparatus according to claim 1 and further including electrodes on the inside of said casing in the vicinity of the ends of said vibrating assemblies.

13. Apparatus according to claim 12 and further including electrical connections through said casing to said electrodes comprising pins vacuum brazed into holes in said casing.

14. Apparatus according to claim 12 wherein said casing is an insulating material and electrodes are plated on the inside of said casing.

15. Apparatus according to claim 14 wherein said casing is made of one of the group consisting of glass and an insulating ceramic.

16. Apparatus according to claim 15 wherein an insulating ceramic consisting of dense aluminum oxide is used.

17. Apparatus as in claim 16 wherein said casing has essentially the same temperature coefficient as said rod.

18. Apparatus as in claim 17 wherein said flexible rod is made of one of the group consisting of single crystal sapphire and cemented titanium oxide.

19. Apparatus as in claim 18 wherein said tubes have the essentially same temperature coefficient as said rod.

20. Apparatus as in claim 19 wherein said tube is made of one of the group consisting of columbium and a columbium-hafnium alloy.

21. Apparatus as in claim 18 wherein said weights have essentially the same temperature coefficient as said flexible rod.

22. Apparatus according to claim 21 wherein said weights are made of a tungsten copper alloy.

23. Apparatus as in claim 1 wherein said flexure comprises a three section gimbal assembly comprising:
   a. a first, lower section having an outside diameter larger than the remainder of said assembly, said larger outside diameter being rigidly coupled to said casing;
   b. a second middle portion gimbaled to said lower portion and by means of flexure hinges permitting rotation about a first axis orthogonal to the longitudinal axis passing through said apparatus;
   c. a third, upper portion having an inside diameter which is smaller than the other two portions, said inside diameter being rigidly coupled to said tube, said upper portion being gimbaled to said middle portion by means of second flexure hinges disposed orthogonal to said first flexure hinges.

24. Apparatus as in claim 23 wherein said flexure is fabricated to achieve a concentric support of the vibrating assembly in said casing.

25. Apparatus as in claim 23 wherein said flexure hinges comprise a narrow section of material formed by fabrication of two closely spaced holes.

26. Apparatus as in claim 23 in which said flexure supports are mounted anti-symmetrical about sid symmetry-plane.

27. Apparatus as in claim 23 wherein said flexure assembly is made of titanium alloy or cemented titanium carbide.

28. Apparatus as in claim 23 wherein said flexure assembly having equal inertia in all mutually perpendicular directions.

29. Apparatus as in claim 1 wherein said gyroscope is configured as a rate gyroscope and further including: first and second sets of orthogonal pickup coils adjacent to the one end of one of said vibrating assemblies; first and second orthogonal forcer coils located adjacent the other of said vibrating assemblies; magnetic materials in the end of each of said vibrating assemblies adjacent said pickup and forcer coils; means for amplifying the output of a first pair of said pickup coils, said means including automatic gain control means and providing an output to a corresponding first pair of said forcer coils, said output being provided in a positive feedback direction to cause said vibrating assemblies to vibrate at a constant amplitude; means for amplifying the output of said second set of pickup coils said amplifying the output of said second set of pickup coils said amplifying means not having automatic gain control and providing its output to said second set of forcer coils, said output being fed back in a negative sense to result in damping of oscillations of said vibrating assemblies; and means for synchronous detecting and filtering of the output of said second amplifier as a measure of the rate about the input axis of said gyroscope.

30. Apparatus according to claim 29 wherein said means for synchronous detecting comprise a demodulator having a signal input from said second amplifier and a reference input from said first amplifier.

31. A vibrating gyroscope comprising:
 a. an elongated hollow casing having a longitudinal axis, said casing having an inside perimeter;
 b. at least one vibrating assembly comprising:
  1. a support tube having an outside perimeter less than the inside perimeter of said casing;
  2. a first inertial weight on one end of said tube; and
  3. a second inertial weight on the other end of said tube;
 c. a flexure disposed between the outside perimeter of said tube and the inside perimeter of said casing supporting said vibrating assembly inside said casing along side longitudinal axis; and
 d. a flexible rod lying on said axis coupling said inertial assembly to said casing.

32. An arrangement to claim 31 wherein two identical vibrating assemblies are supported, by first and second flexures disposed between the outside perimeter of said tube and the inside circumference of said casing symmetrically within said casing on opposite sides of a symmetrical plane.

33. Apparatus as in claim 32 wherein said first and second vibrating assemblies are coupled by separate flexible rods to said casing.

34. Apparatus as in claim 32 wherein said first and second assemblies are coupled by a common flexible rod to each other and to the case.

35. Apparatus as in claim 34 wherein said flexible rod contains a termination bisected by said plane of symmetry, with said termination connected to said casing by means of a connecting ring and wherein said flexible rod is rigidly coupled to the inside of the tube of each of said vibrating assemblies at the end of said assemblies which is further from said plane of symmetry.

36. Apparatus as in claim 31 wherein said gyroscope is configured as a rate gyroscope and further including: first and second sets of orthogonal pickup coils adjacent to the one end of one of said vibrating assemblies; first and second orthogonal forcer coils located adjacent the other of said vibrating assemblies; magnetic materials in the end of each of said vibrating assemblies adjacent said pickup and forcer coils; means for amplifying the output of a first pair of said pickup coils, said means including automatic gain control means and providing an output to a corresponding first pair of said forcer coils, said output being provided in a prositive feedback direction to cause said vibrating assemblies to vibrate at a constant amplitude; means for amplifying the output of said second set of pickup coils said amplifying means not having automatic gain control and providing its output to said second set of forcer coils, said output being fed back in a negative sense to result in damping of oscillations of said vibrating assemblies; and means for detecting the output of said second amplifier as a measure of the rate about the input axis of said gyroscope.

* * * * *